United States Patent
Pouzot et al.

(10) Patent No.: US 10,743,558 B2
(45) Date of Patent: Aug. 18, 2020

(54) COFFEE SCENTING

(71) Applicant: Nestec S.A., Vevey (CH)

(72) Inventors: Matthieu Pouzot, Lausanne (CH); Alessandro Gianfrancesco, Münsingen (CH); Mathieu Murith, Bulle (CH); Gerhard Niederreiter, Savigny (CH); Christoph Reh, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 14/767,174

(22) PCT Filed: Feb. 19, 2014

(86) PCT No.: PCT/EP2014/053184
§ 371 (c)(1),
(2) Date: Aug. 11, 2015

(87) PCT Pub. No.: WO2014/128141
PCT Pub. Date: Aug. 28, 2014

(65) Prior Publication Data
US 2015/0374006 A1    Dec. 31, 2015

(30) Foreign Application Priority Data

Feb. 19, 2013 (EP) ..................................... 13155714

(51) Int. Cl.
*A23F 5/46* (2006.01)
(52) U.S. Cl.
CPC ................ *A23F 5/465* (2013.01); *A23F 5/46* (2013.01)

(58) Field of Classification Search
CPC .... A23F 5/465; A23F 5/05; A23F 5/50; A23F 3/06; A23F 5/24; A23F 5/36; A23F 5/46; A23F 5/48; A23F 5/486; A23N 12/08; F26B 21/083
See application file for complete search history.

(56) References Cited

U.S. PATENT DOCUMENTS

| | | | | |
|---|---|---|---|---|
| 1,292,458 A | * | 1/1919 | Hamor et al. | A23F 5/486 426/386 |
| 2,738,276 A | * | 3/1956 | Blench | A23F 5/486 426/312 |
| 3,532,506 A | * | 10/1970 | Morand | A23F 3/423 34/284 |

(Continued)

FOREIGN PATENT DOCUMENTS

| | | |
|---|---|---|
| CN | 1296385 A | 5/2001 |
| CN | 101292695 A | 10/2008 |

(Continued)

OTHER PUBLICATIONS

International Search Report, dated Mar. 21, 2014, in PCT/EP2014/053184, filed Feb. 19, 2014.

(Continued)

*Primary Examiner* — Steven N Leff
(74) *Attorney, Agent, or Firm* — K&L Gates LLP

(57) ABSTRACT

The invention relates to a device and method for transferring an aroma from a aroma providing substance to a an aroma-adsorbing substance by a gas flow and without the aroma-providing substance and the aroma-adsorbing substance getting in direct contact.

12 Claims, 3 Drawing Sheets

(56) References Cited

U.S. PATENT DOCUMENTS

| | | | | |
|---|---|---|---|---|
| 3,535,118 A | * | 10/1970 | Raben | A23F 5/486 |
| | | | | 426/386 |
| 4,880,656 A | | 11/1989 | Schuetz et al. | |
| 5,043,177 A | * | 8/1991 | Chimel | A23L 1/2217 |
| | | | | 426/386 |
| 2007/0009640 A1 | * | 1/2007 | Hiramoto | A23F 3/06 |
| | | | | 426/597 |

FOREIGN PATENT DOCUMENTS

| | | |
|---|---|---|
| CN | 105007746 A | 10/2015 |
| EP | 0041370 A1 | 12/1981 |
| GB | 1062533 A | 3/1967 |

OTHER PUBLICATIONS

Written Opinion of the International Searching Authority, dated Mar. 21, 2014, in PCT/EP2014/053184, filed Feb. 19, 2014.
CN Application No. 201480008627; Nestec S.A., filed Feb. 19, 2014, Office Action dated Aug. 29, 2018.

* cited by examiner

COFFEE SCENTING

CROSS REFERENCE TO RELATED APPLICATIONS/INCORPORATION BY REFERENCE STATEMENT

This application is a US national stage application filed under 35 USC § 371 of International Application No. PCT/EP2014/053184, filed Feb. 19, 2014; which claims benefit of EP Application No. 13155714.2, filed Feb. 19, 2013. The entire contents of the above-referenced applications are hereby expressly incorporated herein by reference.

BACKGROUND

The presently disclosed and/or claimed inventive concept(s) relates to devices and methods for "scenting" a substance, i.e. transferring volatile aromas from an aroma-providing substance to an aroma-adsorbing nutritional substance, such as (but not limited to) one suitable for preparing a beverage such as coffee, without the aroma-providing substance being in direct contact with the aroma-adsorbing substance.

Several methods are described in the prior art for modulating the flavour of a food substance in particular one suitable for preparing a beverage by adding aromas which are different from the aromas originated from the substance itself.

For roast and ground coffee, a known method consists in de-aromatizing the coffee substance with micro-encapsulated aroma mixed with the coffee powder or by spraying a liquid aroma onto the powder.

DE102008001985A1 relates to a coffee drink which contains natural or artificial flavouring agents. The flavouring agents are mixed directly to the coffee as a powder or a liquid sprayed under high pressure.

WO0100039A1 relates to a composition and process for fixing aroma to a food product, in particular coffee. The aroma is obtained by extraction or concentration, then freeze drying. The freeze dried aroma is directly mixed to non-soluble coffee powder.

CA1141228A1 relates to an aromatized dry food product comprising a blend of roast and ground or soluble coffee and particles of aroma-loaded roast and ground coffee, roast grain or chicory. The transfer of aroma to the coffee can be obtained by different techniques such as a condensed $CO_2$ aroma frost, a liquid condensate or passing a stream of aroma-bearing, low moisture gas through a bed or column of roasted particles. No recycling of the carrier gas is disclosed.

GB716867A relates to a process for aromatizing powder such as soluble coffee or tea by aroma laden stripping process wherein the powder is submitted to an aroma charged inert gas (nitrogen). The aroma substance can be coffee, tea or dried and ground fruit peel. The process requires the powder and the gas carrying the aroma to be heated above ambient temperature and the temperature of the gas to be higher than the temperature of the powder. No recycling of the carrier gas is disclosed.

EP0674839A1 relates to a flavoured roasted coffee. The flavouring substance can be a spice, a plant extract or a fruit powder. The substance may be in the form of an essential oil or fragrance compounds, an aqueous extract or homogenate. The flavouring method consists in thoroughly direct mixing ground coffee with the flavouring substance. Liquid flavouring substances may also be sprayed on the coffee beans or ground coffee.

WO9832339A1 relates to the aromatization of soluble (freeze dried) coffee by aromatized coffee oil sprayed directly on the soluble coffee powder.

US2002127302A1 relates to a particulate food preparation aroma composition for providing aroma to soluble coffee. The aroma composition is based on particles formed of a solid, water-soluble matrix which physically entraps an aromatic volatile other than an essential oil.

U.S. Pat. No. 6,841,185B2 and U.S. Pat. No. 7,763,300B2 relate to flavored compositions comprising roast and ground or soluble coffee and a flavouring component which can be selected from dried flavouring compounds, crystalline or encapsulated flavor or liquid compounds.

U.S. Pat. No. 4,880,656A relates to a process of de-aromatizing and re-aromatizing tea using a moist inert gas to remove aroma from tea, removing moist from the aromatised gas and re-aromatising tea by passing a heated aromatized gas stream in contact with the de-aromatized tea. De-aromatization of the original ingredient is not desirable if one wants to maintain the background aroma profile of the original ingredient. Furthermore, stipping aroma using moisture is not desirable as it adds an intermediate operation for removing water before aromatizing the food ingredient.

U.S. Pat. No. 3,406,074A relates to the production of aromatised (soluble) coffee powder. The aroma is stripped out with an inert gas in moist conditions from roast and ground coffee and condensed. The aroma is separated from gas by gas chromatography and added to soluble powder in coffee oil.

GB1062533A relates to a process for aromatising de-aromatised soluble coffee by stripping aroma by hot gas in counter-flow from roast and ground coffee. The aromatising operation is obtained by a cascade of fluidised bed of coffee. De-aromatisation of the coffee ingredient is not desirable if one wants to maintain the intrinsic aromatic compounds of the original coffee ingredient. The aromatic compounds intrinsically contained in the coffee substance are thereby removed and this operation can denaturize completely the flavour and/or taste of the original coffee ingredient. In particular, certain aroma volatiles can be damaged and/or modified partially or totally. It is therefore virtually impossible to restore the full aroma profile of the original ingredient.

FR2763795A relates to a method for making a vegetal material (e.g., spice) in which, in a first phase, the volatile compounds are extracted from the vegetal material by microwaves and at reduced pressure, the volatiles are condensed and collected in essential oil. A second phase consists in drying the remaining vegetal mass such as by microwaves.

EP0041370 A1 relates to a method for aromatizing a food substrate by cooling the food substrate below −73° C. and contacting it with gaseous food volatiles to condense and adsorb the volatiles thereon. Condensation moisture in contact with the aroma-adsorbing substance is not desired as it can damage the substance and reduce its shelf life.

For certain nutritional substances, in particular, roast and ground coffee, their intrinsic volatile aromas are so delicate that they can easily be degraded and/or eliminated from the substance during the aromatization process. For example, aromatic volatiles such as methanethiol, aldehydes, phenols, pyrazines are particularly sensitive to temperature and/or air. Therefore, while a modulation of the aromatic profile is desired by incorporating aromas from various origins (such as fruits, blossoms, spices and so on), it is also important to maintain the balance (quality, quantity, aromatic profile, . . . ) of the aromatic compounds intrinsically contained in the substance to not denaturize completely the flavour and/or taste of the original beverage.

There is a demand for a method for scenting a nutritional substance, in particular, one suitable for preparing a beverage, by aromas of (such as (but not limited to)) natural origin that avoids the disadvantages of the prior art. There is also a need for a method providing an effective transfer of the aromas to the nutritional substance while avoiding the transfer of possible undesired contaminants and while avoiding the aromas intrinsically contained in the nutritional substance to become degraded or eliminated. In particular, there is also a need for a method particularly suitable to promote a rapid transfer of aromas from natural aroma sources at improved process conditions.

The presently disclosed and/or claimed inventive concept(s) proposes a solution to meet one or more of these needs and overcome or at least alleviate these disadvantages.

DETAILED DESCRIPTION

Figure 1:
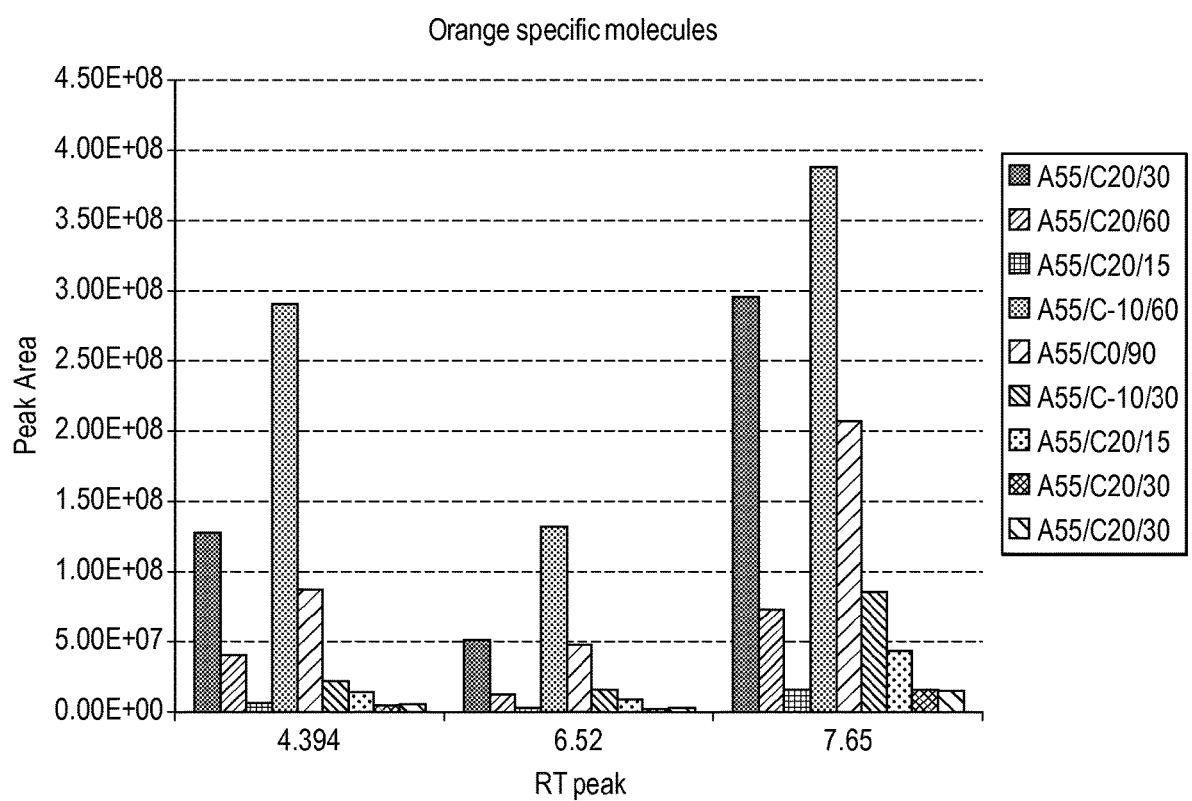
FIG. 1 relates to peak areas obtained by integration of chromatogram at different retention times (RT) associated to specific orange flavor molecules.

The presently disclosed and/or claimed inventive concept(s) is related to a device for scenting a nutritional substance comprising:
- a first cell containing volatile aromas providing substance and a second cell containing an aroma-adsorbing nutritional substance,
- aroma circulating means comprising a carrier gas suitable for carrying volatile aromas, a gas pump and a first tubing connecting the first cell to the second cell, for allowing the carrier gas to desorb volatile aromas contained in the substance in the first cell and to transport it to the second cell and pass it through the aroma-adsorbing nutritional substance,
- wherein the aroma circulating means further comprise a second tubing connecting the second cell to the first cell for allowing the gas to pass from the second cell through the second tubing to the first cell, and wherein the first cell, the second cell, the first tubing, and the second tubing are arranged to circulate the carrier gas in a closed loop.

The aroma-adsorbing substance is, for example but not by way of limitation, a powder, agglomerate or leaf fragments suitable for preparing a beverage by mixing or brewing in combination with water. In a particular, non-limiting embodiment, the aroma adsorbing substance is chosen amongst the group consisting of: coffee, tea, chicory, cocoa, barley, milk powder and combinations thereof.

In certain, non-limiting embodiments, the aroma-adsorbing substance is a roasted substance containing intrinsic aroma volatiles. Roasting generally enables to develop intrinsic aroma volatiles in the substance. Aroma volatiles are developed such as by Maillard or non-enzymatic browning reaction, Strecker degradation or other types of components degradations (e.g., sugar, phenol, lipid).

In certain, non-limiting embodiments, aroma-adsorbing substance is a non de-aromatised substance.

In certain, non-limiting embodiments, the aroma-adsorbing substance contains intrinsic aroma volatiles compounds. Aroma volatiles may comprise: aliphatic (e.g., carbonyl, sulfur), alicyclic (e.g., ketone), aromatic benzenoid (e.g., phenols); heterocyclic (e.g. furans, hydrofurans, pyrroles, pyridines, pyrazines, thiazoles, quinolones) and combinations thereof.

In certain, non-limiting embodiments, the aroma-adsorbing substance is roasted and ground coffee.

In certain, non-limiting embodiments, the aroma providing substance is a substance of non-coffee origin. In particular, when the aroma-adsorbing substance is roasted and ground coffee, the aroma providing substance is a substance of non-coffee origin.

The aroma providing substance is, for example but not by way of limitation, a substance of natural origin chosen amongst the group consisting of: fruits, spices, bark, herbs, plants, leaves, nuts, grains, seeds, flowers, blossoms, buds, roots, bulbs, rhizomes, wood and combinations thereof.

The aroma providing substance is (in certain, non-limiting embodiments) in the form of dry solids, in particular, powder, peels, pieces, pellets, fibers, flakes, fragments and combinations thereof.

The aroma providing substance has (in certain, non-limiting embodiments) a water content as low as possible to avoid transporting of humidity in the stream of gas. In certain, non-limiting embodiments, the water content of the aroma providing substance is equal to or lower than the water content of the nutritional substance. In certain, non-limiting embodiments, the water content of the aroma providing substance is lower than 12% in weight, such as but not limited to lower than 10% in weight, or between 0.01% and 5% in weight, or between 0.01% and 3% in weight. In non-limiting examples, the water content of the substance is lower than or equal to 3% in weight.

The first cell is U connected to a temperature-controlled heating device allowing the temperature of the first cell to be adjusted to a temperature (within a range of temperatures) that allows the evaporation of volatile aromas, optionally said temperature being ambient or (in certain, non-limiting embodiments) above ambient temperature, such as (but not limited to) between 30° C. and 70° C., or between 40 and 65° C., or between 45 and 55° C. In a non-limiting example, the temperature of the first cell is controlled at 45° C. or 55° C. These warm conditions ensure the quicker and more complete removal of the aromas from the aroma-desorbing substance while not damaging them. Since the system is arranged in closed loop, this also minimizes the loss of the intrinsic aromas. In particular, it ensures that if aromas are accidentally stripped (lost) from the nutritional (adsorbing) substance, they remain in gaseous phase and are recirculated to be reincorporated into the nutritional substance.

The second cell can be connected to a temperature-controlled cooling or freezing device allowing the temperature of the second cell to be adjusted to the ambient temperature or (in certain, non-limiting embodiments) below ambient temperature, such as (but not limited to) between 10° C., and −50° C., or between 0 and −20° C. In non-limiting examples, the temperature of the cell is maintained respectively at 20° C., 10° C., 0° C., −5° C. or −10° C. The cooling or freezing conditions are particularly advantageous for nutritional substances containing volatile intrinsic aromas such as roast and ground coffee. These conditions ensure that the loss of these aromas is minimized.

The combination of these processing (heating and cooling/freezing) conditions and the closed loop arrangement ensures that the transfer of the "added" aromas is maximized and the undesired losses of "intrinsic" aromas are minimized.

The carrier gas is (in certain, non-limiting embodiments) dry. The carrier gas is (in certain, non-limiting embodiments) as dry as possible and (in certain, non-limiting embodiments) at a sufficiently low relative humidity to prevent the nutritional substance to adsorb water during the aroma transfer. Indeed, humidity transfer might adversely affect the aroma transfer conditions (e.g. condensation, crystallization, delayed adsorption, . . . ) and/or modify the final properties (e.g. water content) of the nutritional product. The carrier gas has a relative humidity of less than 20% (by wt.), such as (but not limited to) less than 10%, or less than 5%, or less than 1%.

Therefore, the adsorption of volatile aromas is a condensation-free adsorption.

The second cell (in certain, non-limiting embodiments) contains a stirrer. As a result, the overall surface of contact of the substance exposed to the aroma-loaded gas current is increased, thereby improving the aroma transfer to the substance. In another aspect, the presently disclosed and/or claimed inventive concept(s) relates to a method for scenting a nutritional substance comprising the steps of:

passing a carrier gas through a first cell comprising an aroma providing substance thereby desorbing the volatile aromas from the aroma providing substance by the carrier gas, transporting the carrier gas from the first cell to a second cell comprising an aroma-adsorbing nutritional substance, passing the carrier gas through the aroma-adsorbing substance comprised in the second cell thereby adsorbing the volatile aromas to the aroma-adsorbing substance, returning the carrier gas from the second cell to the first cell and, repeating the previous steps thereby allowing the gas to re-circulate in the first cell and the second cell in a closed loop.

To avoid too many repetitions, all the other properties and characteristics of the substances, gas and device as previously described in relation to the device of the presently disclosed and/or claimed inventive concept(s) are equally applicable for the method of the presently disclosed and/or claimed inventive concept(s).

The aroma-adsorbing substance is (in certain, non-limiting embodiments) a powder derived from a natural source such as coffee, tea, chicory, barley, cocoa, milk powder and combinations thereof.

For coffee, the substance is (in certain, non-limiting embodiments) chosen amongst the group consisting of: roast and ground coffee, roasted coffee beans, green coffee, soluble coffee and combinations thereof.

In certain, non-limiting embodiments, the aroma-adsorbing substance is thus one selected amongst those suitable for preparing a beverage by mixing, brewing or dissolution in presence of a diluent, in particular, water.

The aroma-adsorbing substance has (in certain, non-limiting embodiments) a low water content. In certain, non-limiting embodiments, the water content is below 18% in weight, such as but not limited to, below 15%, or between 3 and 12% wt.

In certain, non-limiting embodiments, the aroma-adsorbing substance is roast and ground coffee.

The first cell can be adjusted at ambient temperature or a temperature above the ambient temperature, such as (but not limited to) between 30 and 70° C., between 40 and 65° C., or between 45 and 55° C. The particular temperature is (in certain, non-limiting embodiments) chosen to vaporize (at least a desired fraction of) volatile aromas contained in the substance but below the temperature at which the desired aromas can deteriorate.

The second cell can be adjusted at an ambient temperature or, (in certain, non-limiting embodiments) at a temperature below the ambient temperature, such as (but not limited to) between 10° C. and −50° C., or between 0° and −40° C., or between −5 and −20° C. In non-limiting examples, the temperature of the cell is respectively maintained at 20° C., 10° C., 0° C., −5° C. or −10° C.

The aroma providing substance has (in certain, non-limiting embodiments) a water content as low as possible to avoid transporting of humidity in the stream of gas. In certain, non-limiting embodiments, the water content of the aroma providing substance is equal to or lower than the water content of the nutritional substance. In certain, non-limiting embodiments, the water content of the aroma providing substance is lower than 12% in weight, such as (but not limited to) lower than 10% in weight, or between 0.01% and 5% in weight. In non-limiting examples, the water content of the substance is lower than or equal to 3% in weight.

The aroma-adsorbing substance in the second cell is (in certain, non-limiting embodiments) stirred during the gas carried being circulated. As a result, the available surface of contact of the substance with the gas is increased, thereby promoting the aromatic adsorption.

In a subsequent step, the scented nutritional product, such as (but not limited to) roast and ground coffee, is filled in the body of a capsule intended for the preparation of a beverage, and the body is closed by a lid. In certain, non-limiting embodiments, the body is hermetically sealed by the lid, such as a foil, to form a gastight enclosure for the scented nutritional product.

A further embodiment relates to a scented nutritional product that is obtainable by the method of the presently disclosed and/or claimed inventive concept(s). A further embodiment relates to a capsule containing the scented nutritional product that is obtainable by the method of the presently disclosed and/or claimed inventive concept(s).

"Aromas" in the sense of the presently disclosed and/or claimed inventive concept(s) is one or more flavours or flavourings mediated by substances/compounds that are volatile at certain temperatures and leave a sensory impression with respect to smell and/or taste. These can be natural flavouring substances, nature-identical flavouring substances, or artificial flavouring substances. These aromas can be contained in aroma providing substances which can comprise substances/compounds that intrinsically do not comprise an aroma unless the aroma providing substance is qualified in the text as a substance of "natural origin".

"Intrinsic aroma" or "intrinsic aroma volatiles" generally refers to aroma which is contained in the substance naturally or by development such as by heat processing, e.g., roasting, of a substance. For roast and ground coffee, it refers to the aroma volatiles present after roasting.

A "nutritional substance" is the sense of the presently disclosed and/or claimed inventive concept(s) any substance that is consumed by a human or animal and that either provides nutrients to the body and/or has a stimulating effect or improves other cognitive functions on the body.

A "cell" in the sense of the presently disclosed and/or claimed inventive concept(s) is a chamber, container, incubator, tunnel or conveyor suitable for receiving the aroma providing substance and/or the aroma-adsorbing substance.

A cell should not be considered as limited to a means for treating the substances in batches only but encompasses continuous or semi-continuous systems.

"Tubings" in the sense of the presently disclosed and/or claimed inventive concept(s) are generally non rigid or rigid, not necessarily cylindrical, tubular means (e.g. pipes, conduits, chambers, and the like) that connect the cells. They can be made of any suitable material like plastic and/or metal.

The section headings serve to clarify the subject matter and should not be interpreted to limit the subject matter. If ranges of values are disclosed each individual value is considered to be covered by the range, in particular, each integer number.

General Principles of the Presently Disclosed and/or Claimed Inventive Concept(s)

The principle of the method and device of the presently disclosed and/or claimed inventive concept(s) involves transporting volatile aroma molecules through a carrier gas from an aromatic source to the substance to be scented aroma-adsorbing substance, where the molecules are adsorbed without the aromatic source directly contacting the substance to be scented.

The substance to be scented or aroma-adsorbing substance also contains volatile molecules, (referred as "intrinsic aromas or aromatic compounds" in the present description), but processing conditions ensure that these molecules are not desorbed in a significant amount.

The substance to be scented aroma-adsorbing substance is (in certain, non-limiting embodiments) under the form of powder, peels, pieces, pellets, fibers, fragments, flakes and combinations. In certain, non-limiting embodiments, the substance is a substance suitable to prepare a beverage by addition of water such as by mixing, extraction, dissolution and the like. In certain, non-limiting embodiments, the substance is roast and ground coffee.

The roasted coffee is characterized by several hundreds of components in a vast concentration range. The main classes of: compounds that are known in standard roasted coffee are: furans, pyrazines, ketones, alcohols, aldehydes, esters, pyrroles, thiophenes, sulfur compounds, benzenic compounds, phenolic compounds, phenols, pyridines, thiazoles, oxazoles, lactones, alkanes, alkenes, and acids. The coffee chemical composition also depends upon a variety of factors, such as species and variety of bean, geographic origin, soil conditions, storage of the beans, time and temperature of the roasting procedure. It can be understood that if several of these intrinsic aromatic compounds are deteriorated, this creates a critical unbalance or damage of the flavour and/or taste profile. One non-limiting embodiment of the presently disclosed and/or claimed inventive concept(s) is to prevent the loss and deterioration of these intrinsic aroma compounds.

In the method of the presently disclosed and/or claimed inventive concept(s), this coffee substance is aromatized with natural aroma of relatively high volatility coming from an aroma-desorbing substance or natural aromatic ingredients. These aromatic ingredients form a source separate from the roast and ground coffee. The volatile aromas from these natural ingredients are transferred to the roast and ground coffee by a carrier gas after stripping of the ingredients by the gas.

In certain, non-limiting embodiments, the carrier of aromas is an inert gas such as nitrogen, $CO_2$, argon or combinations thereof. The presence of oxygen is also prevented or reduced to minimal percentages (e.g., less than 2%). Thus, the coffee is not oxidized by the carrier gas. The gas is passed through the natural ingredients then through the coffee bed which adsorbs the stripped high volatiles carried by the gas. In certain non-limiting embodiments, the coffee substance is maintained at ambient temperature or, in particular non-limiting embodiments, below ambient temperature as an elevated temperature would accelerate the degradation (oxidation) of coffee and would also induce the vaporization of the intrinsic aroma compounds found in the coffee and so ultimately would lead to a loss of such compounds.

The carrier gas should (in certain, non-limiting embodiments) be dry (e.g. relative humidity lower than 5% wt.) to avoid a detrimental transfer of moisture to the coffee.

Stripping of coffee aroma is minimized by using a closed loop gas circuit as a particular (but non-limiting) option. The headspace in the coffee cell should also be (in certain, non-limiting embodiments) kept as small as possible to optimize the concentration of aroma. In certain, non-limiting embodiments, the headspace is sized large enough to ensure a proper stirring of the coffee powder in the cell but any dead space (i.e., having no function but decreasing aroma concentration in the cell) is (in certain, non-limiting embodiments) eliminated.

The result is a natural loading of aroma from the natural raw material source to the coffee. Since there is no physical contact between the coffee mass and the source of natural aroma raw material, there is no or at least a reduced risk of transfer of contaminants such as pesticides, impurities, (certain) solvents or other undesirable components from the raw aromatic material to the coffee.

The aroma providing substance or source of aroma is (in certain, non-limiting embodiments) a substance of natural origin chosen amongst the group consisting of: fruits, spices, bark, herbs, plants, leaves, nuts, grains, seeds, flowers, blossoms, buds, roots, bulbs, rhizomes, wood and combinations thereof.

The aroma providing substance, stripped by the gas, can be dry solids such as powder, peels, fragments, flakes, nuts, grains, seeds.

In another mode, the aroma providing substance can be an oil-based mixture such as essential oil or oleoresin.

The aroma providing substance or source of aroma is (in certain, non-limiting embodiments) dehydrated. In a particular, non-limiting embodiment, the aroma providing substance is freeze dried, to lower humidity and preserve the integrity of the aromatic compounds.

In the cell, the source of aroma is (in certain, non-limiting embodiments) heated above ambient temperature. In certain, non-limiting embodiments, it is heated in a controlled manner between 40 and 70° C. for evaporating aromatic volatiles from the source. Also, in certain cases, the heat, when properly controlled, may further initiate aromatic compounds from certain particular substances (e.g., vanillin from oak). When the temperature is too high such as above 70° C., certain aromatic volatiles might be degraded.

The substance to be scented (such as, but not limited to, roast and ground coffee) is (in certain, non-limiting embodiments) maintained at temperature below ambient to reduce oxidation and loss of aromatic compounds intrinsically contained in the substance. In certain, non-limiting embodiments, the substance is maintained between −50 and 10 degrees Celsius, such as but not limited to, between −20° C. and 0° C. The temperature is also controlled to prevent moisture condensation and transfer at the surface of the coffee.

The aromatized substance such as aromatized roast and ground coffee can be filled in a capsule for preparing a beverage in a beverage production device. The device can typically be a coffee machine using a single-use capsule for extracting a coffee extract by injecting pressurized hot water in the capsule such as described in EP0512470. The capsule can be hermetically sealed by a lid such as a membrane so that the aroma is kept inside the capsule until the capsule is opened, such as by perforation during the injection of extraction liquid in the capsule.

Scenting Device

Figure 3:
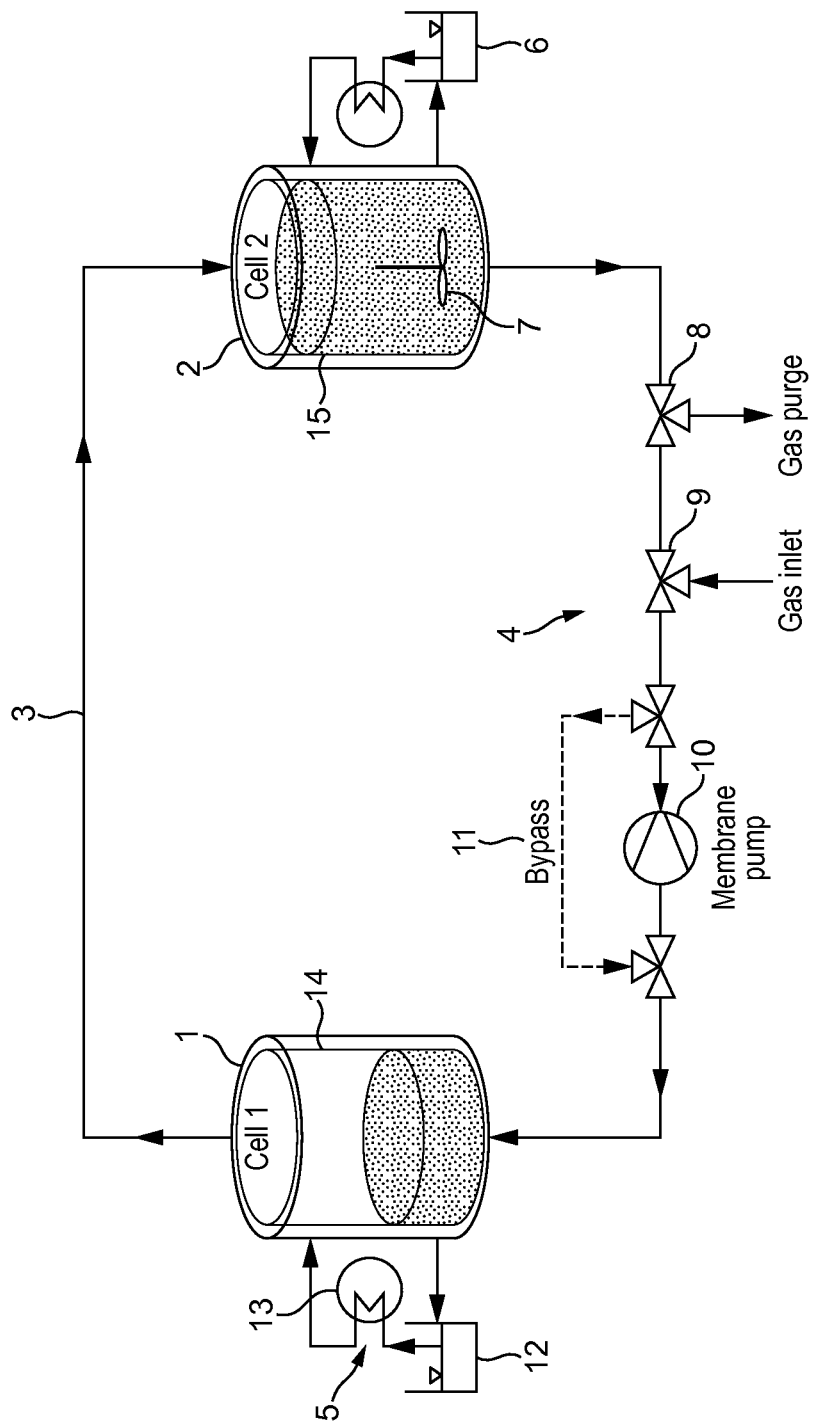
FIG. 3 relates to a schematic representation of the scenting unit used in the examples.

The presently disclosed and/or claimed inventive concept(s) is related to a device for scenting a nutritional substance as shown in FIG. 3. The device may comprise a first cell 1, a second cell 2, a first tubing 3 and a second tubing 4. The first cell 1 is connected to the second cell by the first tubing, arranged for a fluid transport from the first cell to the second cell. It should be noted that the outlet of the first cell and the inlet of the second cell can be placed adjacent one another so that the length of the first tubing 3 is minimized as much as possible. The second cell is connected to the first cell by the second tubing 4 arranged for a feedback transport of fluid from the second cell to the first cell.

The device allows a gas, being suitable as a carrier for volatile aromas, to traverse the substance providing said aromas, to pass through the first tubing 3 and to enter into the second cell 2. The device is also arranged for allowing the gas to pass through an aroma-adsorbing nutritional substance comprised in the second cell 2 and for allowing the aroma-depleted gas to pass from the second cell through the second tubing back to the first cell. Thus the first cell 1, the second cell 2, the first tubing 3, and the second tubing 4 form together a closed gas circulation loop.

This device allows stripping the aroma from the aroma-desorbing substance and charging it to the aroma-adsorbing substance more efficiently by this continuous closed loop recycling process. This maintains a relatively high concentration of aroma in the carrier gas and so in the coffee cell and thereby increases the overall contact time of the aroma with the coffee.

The carrier gas is chosen to be in a gaseous state at the temperatures used in the practice of the presently disclosed and/or claimed inventive concept(s). The gas is (in certain, non-limiting embodiments) inert meaning that it does not undergo chemical reactions under the process conditions with the materials of the device or any of the organic compounds. In particular, the inert gas does not oxidize the aroma-adsorbing substance (e.g., coffee). The gas is (in certain, non-limiting embodiments) nitrogen, carbon dioxide, argon and combinations thereof. The circulating means of the device is also arranged to minimize the oxygen level as much as possible (e.g., below 5%, such as (but not limited to) below 3% of relative concentration). The pressure of gas in the closed circuit can be slightly above atmospheric pressure, at atmospheric pressure or slightly below.

The aroma-adsorbing substance can be a powder, leaves or fragments derived from a natural source. The natural source may be of vegetal and/or animal origin. The aroma-adsorbing substance is (in certain, non-limiting embodiments) chosen amongst: coffee, tea, chicory, barley, milk powder and combinations thereof. The coffee is (in a particular, non-limiting embodiment) roasted and ground coffee.

The aroma providing substance (or aroma desorbing-substance) can be any substance that is capable to release a natural or artificial aroma upon contact with a carrier gas. In particular, natural substances are desired in certain non-limiting embodiments.

In particular, examples of aroma providing substances are:
  fruits, such as: orange such as dried orange peel, vanilla, citrus, bergamot, banana, apple, strawberry, cherries,
  spices or bark, such as: cinnamon, pepper, clove,
  herbs or plants, such as: thyme, basils, laurels, mint, origan, *verbena*, melissa,
  leaves, nuts, grains, seeds, flowers, blossoms, buds, such as: *eucalyptus*, coriander, anise, chamomile, viola, lavander, jasmine, coumarin, cocoa,
  roots, bulbs, rhyzomes or wood, such as gentian, cardomon, ginger, rose oak, pine, cedar, agarwood.

The natural source is (in certain, non-limiting embodiments) used in dehydrated form, such as (but not limited to) in freeze dried form. Freeze drying is a gentle method for drying a natural organic substance that retains most of the aroma in the aroma providing substance because freeze drying takes place at a sufficiently low temperature (e.g. −50° C.) to minimize heat damage on the volatiles.

In certain non-limiting embodiments, it may also be desired that the aroma imparted on the aroma-adsorbing substance differs from the aroma(s) that the aroma-adsorbing substance naturally possesses. It is particularly true for roast and ground coffee for which "foreign" aromatic compounds such as esters or linear or aromatic terpenes present in fruits or blossoms can be added to the coffee. As a result, a modulation of the coffee is made possible within a wider spectrum of tastes and/or flavours.

The ratio (in weight) of the aroma providing substance to the nutritional substance may greatly vary depending of various factors such as the transfer conditions, the type and/or quality of the raw materials, the degree of scenting desired, etc. It may, for instance be from 1:50 to 2:1, such as (but not limited to) from 1:10 to 1:1.

The first cell can be connected to a heating device 5 allowing the temperature of the first cell to be adjusted to a temperature that allows the evaporation of one or more volatile aromas, optionally said temperature being between ambient temperature and 70° C. at most. The temperature can be between 30° C. and 70° C., such as (but not limited to) between 30° and 65° C., or 45 and 55° C. The temperature will essentially depend from the volatile properties of the aroma-providing substance. A warm temperature will be chosen that allows desorbing a maximum of the desired aroma from the aroma-providing substance by the carrier gas without thermally degrading the aromas. As illustrated in FIG. 3, the heating means can be, for example, a closed water circuit 5 comprising a water tank 12 and a heater 13 adapted to circulate hot water on an outer hollow jacket 14 of the cell.

The second cell (2) can be connected to a cooling or freezing device (6) allowing the temperature of the second cell to be adjusted to a temperature being below ambient temperature, such as (but not limited to) between +10 and −50° C. The temperature can be between +10° C. and −25° C. The temperature is (in certain, non-limiting embodiments) between 0° C. and −20° C., such as (but not limited to) between −5 and −20° C. The temperature will be chosen depending on the properties of the aroma and the aroma-adsorbing nutritional material. Thus, the temperature will be a temperature where a maximum of aroma adsorption to the aroma-adsorbing nutritional material occurs. The cooling device can be any suitable device such as a cryogenic bath, a frigorific circuit and the like, linked to a cooling jacket 15 of the cell. The first and/or the second cell (including hollow jackets 14-15) can be made of any suitable inert and temperature conductive material such as inox. The tubings can also be made of same material.

The carrier gas is (in certain, non-limiting embodiments) dry or in equilibrium with the adsorbing nutritional substance, in particular the carrier gas has a relative humidity lower than 10%, such as (but not limited to) between 0.1% and 3%. Relative humidity is determined at the lowest temperature the gas assumes when passing through the device.

The second cell can contain a stirrer 7. The stirrer can be a mechanical stirrer and/or a fluidic stirrer, i.e., obtained by fluidic turbulence such as being formed by high velocity (inert) gas stream(s) sent through one or more nozzles in the cell.

In a possible example, the mechanical stirrer is driven by a rod and a motor from the outside of the cell or be a ferro-magnetic or magnetic member magnetically driven by an electro-magnetic motor external to the cell. Stirring can occur during the entire time the device is used to impart a scent on the aroma-adsorbing substance. In this way, the absorption is made more efficient because the substance is homogenously exposed to the aroma.

Possibly, the stirrer and cooling means are obtained by injecting cooled inert gas in the cell.

In certain, non-limiting embodiments, the second tubing 2 from the second cell 2 to the first cell 1 can further comprise a gas inlet 9 to inject gas in the circuit for initiating the process. The device many also comprise a gas purge 8 to remove air when the circuit is placed under gas pressure or remove depleted gas from the circuit during change-over of aromatic compounds or cleaning. The pump can be a membrane pump 10 or any suitable pneumatic pump such as a piston pump. The pump 10 may be selectively by-passed by a bypass tubing 11 which is used, for instance during introduction of gas in the circuit to avoid damaging the pump (in particular, membrane pumps).

Method

A further embodiment relates to a method for scenting a nutritional substance comprising the steps of:
   passing a carrier gas through a first cell 1 comprising an aroma providing substance thereby desorbing volatile aromas from the aroma providing substance by the carrier gas,
   transporting the carrier gas from the first cell 1 to a second cell 2 comprising an aroma-adsorbing nutritional substance,
   passing the carrier gas through the aroma-adsorbing substance comprised in the second cell 2 thereby forcing the aroma-adsorbing substance to adsorb volatile aromas from the carrier gas,
   returning the carrier gas from the second cell 2 to the first cell 1,
   repeating the previous steps thereby allowing the gas to re-circulate in the first cell and the second cell in a closed loop.

In certain, non-limiting embodiments, the method will involve the use of the device of the presently disclosed and/or claimed inventive concept(s) described above.

The carrier gas will be a gas that is in gaseous state at the temperatures used in the practice of the presently disclosed and/or claimed inventive concept(s). The gas is (in certain, non-limiting embodiments) inert as described previously. The gas can be nitrogen, carbon dioxide, argon and combinations thereof.

The aroma-adsorbing substance can be a powder, leaves or fragments derived from a natural source. The natural source may be of vegetal or animal origin. The aroma-adsorbing substance is (in certain, non-limiting embodiments) chosen amongst: coffee, tea, chicory, barley, cocoa, milk powder and combinations thereof. The coffee is (in certain, non-limiting embodiments) roasted and ground coffee.

The aroma providing substance can be a substance as described previously.

The method is carried out according to the non-limiting process conditions defined for the device as described previously.

The method (in certain, non-limiting embodiments) employs the substances as described in relation to the device.

Scented/Aromatized Product

A further embodiment relates to a scented nutritional product that is obtainable by the method of the presently disclosed and/or claimed inventive concept(s) and/or by use of the device of the presently disclosed and/or claimed inventive concept(s).

A further embodiment relates to a capsule containing the scented nutritional product that is obtainable by the method of the presently disclosed and/or claimed inventive concept(s). The aromatized substance such as aromatized roast and ground coffee can be filled in a capsule for preparing a beverage in a beverage production device such as a coffee machine using a single-use capsule.

The capsule can be hermetically sealed by a lid such as a membrane so that the aroma is maintained inside the capsule until the capsule is opened, such as during the injection of extraction liquid in the capsule.

EXAMPLES

Example 1

Coffee Scenting with Fruit Aroma

The objective of these trials was to scent roast and ground coffee with a natural fruit aroma from dehydrated fruit.

In each experiment (Table 1), 80 g to 240 g of roast and ground coffee powder were placed in a first inox cell of the scenting unit. The coffee powder was kept at different constantly controlled temperatures, respectively, 20° C., 0° C., −10° C., and continuously stirred during the process. 16 g to 32 g of freeze dried orange peel (of water content below 3% wt.) were placed in the second inox cell, heated at 55° C. This temperature promoted the volatilization of the aromatic molecules while avoiding their thermal degradation. The line was purged from air and filled with dry nitrogen at ambient temperature (25° C.), and the gas circulated in a closed loop with a flow rate of 3 l/h during 15 to 60 minutes.

TABLE 1

Processing conditions used during scenting of roast and ground coffee with orange aroma.

| Orange dried peel (g) | Coffee powder (g) | T orange peel (° C.) | T coffee (° C.) | Ratio aroma providing Substance to coffee (% wt.) | Time (min) |
|---|---|---|---|---|---|
| 32 | 80  | 55 | 20  | 40.00 | 30 |
| 32 | 160 | 55 | 20  | 20.00 | 60 |
| 32 | 240 | 55 | 20  | 13.33 | 15 |
| 32 | 80  | 55 | −10 | 40.00 | 60 |
| 32 | 160 | 55 | 0   | 20.00 | 90 |
| 16 | 80  | 55 | −10 | 20.00 | 30 |
| 32 | 80  | 55 | 20  | 40.00 | 15 |

TABLE 1-continued

Processing conditions used during scenting of roast and ground coffee with orange aroma.

| Orange dried peel (g) | Coffee powder (g) | T orange peel (° C.) | T coffee (° C.) | Ratio aroma providing Substance to coffee (% wt.) | Time (min) |
|---|---|---|---|---|---|
| 16 | 160 | 55 | 20 | 10.00 | 30 |
| 32 | 160 | 55 | 20 | 20.00 | 30 |

Gas chromatography (head space analysis) was used to measure the presence of specific orange molecules in the coffee powder after the process. Orange aroma molecules could be analytically detected in all tested conditions (FIG. 1). The graphic shows the peak areas obtained by integration of the chromatogram at different retention times (RT) associated to the specific orange aromatic molecules. In particular, the aromatic molecules detected were: limonene (Retention Time: 8.50), pinene (RT: 6.5), myrcene (RT: 7.65). A bigger area indicates the presence of a higher quantity of the volatile molecules. Legend: A=temperature of the aromatic source (° C.)/C=temperature of the coffee powder (° C.)/duration of the trial (min). A gas chromatography was also carried out to measure the coffee aroma in the aromatized coffee powder immediately after the aromatization process and confirmed that coffee aromas are maintained in the aromatized coffee powder (not shown).

Example 2

Coffee Scenting with Spice Aroma

The objective of these trials was to scent roast and ground coffee using as the aroma providing substance, respectively, cinnamon powder obtained from dried natural cinnamon sticks and vacuum dried vanilla blossoms.

In each experiment (Tables 2 and 3), 80 g to 320 g of roast and ground coffee powder were placed in a first inox cell of the scenting unit.

TABLE 2

Processing conditions used during scenting of roast and ground coffee with natural cinnamon aroma.

| Cinnamon (g) | Coffee powder (g) | T cinnamon (° C.) | T coffee (° C.) | Ratio aroma providing substance to coffee (% wt.) | Time (min) |
|---|---|---|---|---|---|
| 10 | 80 | 45 | 10 | 12.50 | 30 |
| 10 | 160 | 45 | 10 | 6.25 | 60 |
| 10 | 80 | 45 | −5 | 12.50 | 30 |
| 10 | 160 | 45 | −5 | 6.25 | 90 |
| 50 | 80 | 55 | 20 | 62.50 | 30 |
| 50 | 160 | 55 | 20 | 31.25 | 60 |
| 50 | 240 | 55 | 20 | 20.83 | 150 |
| 50 | 320 | 55 | 20 | 15.63 | 90 |
| 16 | 80 | 55 | −10 | 20.00 | 30 |

TABLE 3

Processing conditions used during scenting of roast and ground coffee with dried natural vanilla.

| Vanilla (g) | Coffee powder (g) | T vanilla (° C.) | T coffee (° C.) | Ratio aroma providing substance to coffee (% wt.) | Time (min) |
|---|---|---|---|---|---|
| 7 | 80 | 55 | −10 | 8.75 | 30 |
| 7 | 160 | 55 | 0 | 4.38 | 30 |
| 16 | 80 | 55 | −10 | 20.00 | 30 |

The source of aromatic powder was maintained at various constant temperatures, respectively, 20° C., −5° C., −10° C. for the cinnamon and 0° C. and −10° C. for the vanilla, and continuously stirred during the process. 10 g to 50 g of crushed cinnamon sticks (water content below 3% wt.) or vacuum dried vanilla sticks (water content below 3% wt.) were placed in the second inox cell, heated respectively at 45° C. and 55° C. for cinnamon and 55° C. for vanilla. This temperature promoted the volatilization of the aromatic molecules while avoiding their thermal degradation. The line was purged from air and filled with dry nitrogen at ambient temperature (25° C.), and the gas circulated in a closed loop with a flow rate of 3 l/h during 30 to 150 minutes.

Figure 2:
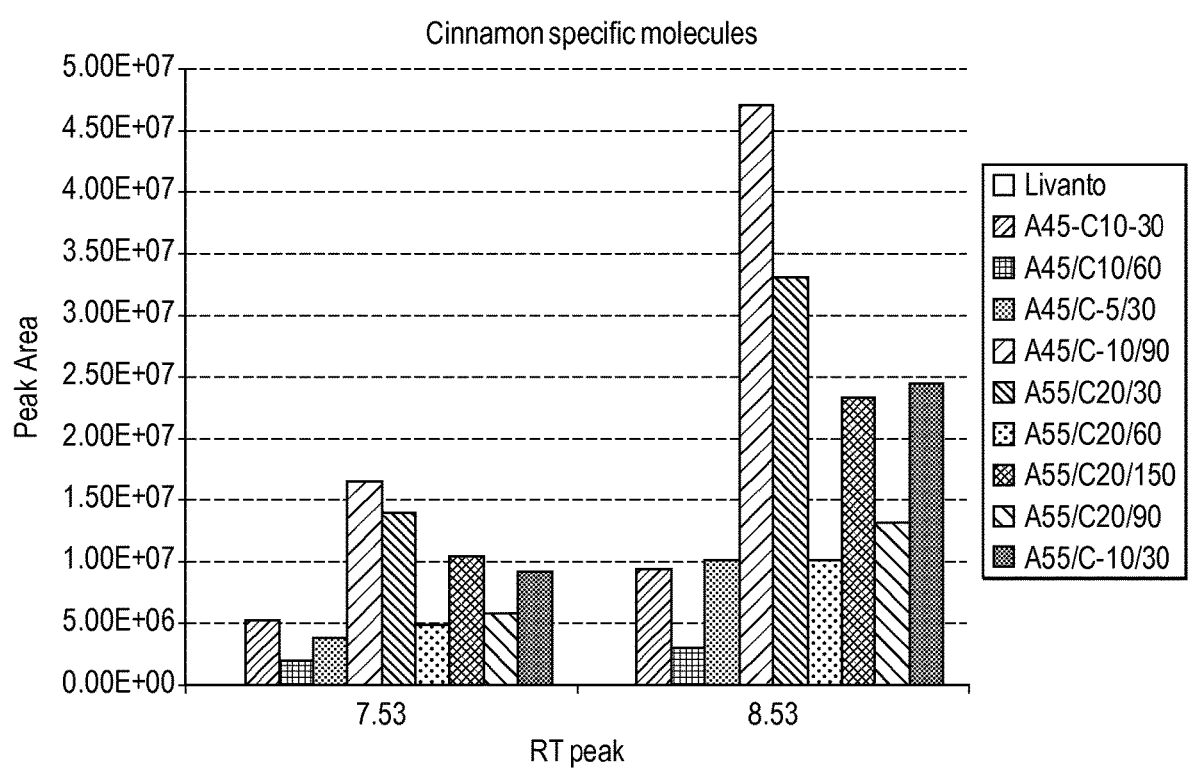
FIG. 2 relates to peak areas obtained by integration of chromatogram at different retention times (RT) associated to specific cinnamon flavor molecules.

Gas chromatography (head space analysis) was used to measure the presence of specific cinnamon or vanilla molecules in the powder after the process. Cinnamon or vanilla aroma molecules could be analytically detected for all tested conditions (FIGS. 2 and 3). The graphic shows the peak areas obtained by integration of the chromatogram at different retention times (RT) associated to the specific aromatic molecules. In particular, the aromatic molecules detected were: phellandrene (RT: 7.53), terpinene: (7.88) and sabinene. A bigger area indicates the presence of a higher quantity of the volatile molecules. Legend: A=temperature of the aromatic source (° C.)/C=temperature of the coffee powder (° C.)/duration of the trial (min). A gas chromatography was also carried out to measure the coffee aroma in the aromatized coffee powder immediately after the aromatization process and confirmed that coffee aromas are maintained in the aromatized coffee powder (not shown).

The invention claimed is:

1. A method for scenting a nutritional substance, the method comprising:
    passing a carrier gas through a first cell comprising an aroma providing substance of non-coffee origin, thereby desorbing volatile aromas from the aroma providing substance by the carrier gas, wherein the first cell is adjusted to a temperature between 30° C. and 70° C., wherein the aroma providing substance brought into contact with the carrier gas is in the form of at least one dry solid selected from the group consisting of powder, peels, pieces, pellets, fibers, flakes, fragments, and combinations thereof, wherein the aroma providing substance is a substance of natural origin selected from the group consisting of fruits, spices, bark, herbs, plants, leaves, nuts, grains, seeds, flowers, blossoms, buds, roots, bulbs, rhizomes, wood, and combinations thereof, and wherein the water content of the aroma providing substance is lower than or equal to 3% in weight and wherein the carrier gas has a relative humidity of less than 5% by weight;
    transporting the carrier gas from the first cell to a second cell, wherein the second cell comprises an aroma-adsorbing nutritional substance, wherein the temperature in the second cell is adjusted to consist of a single temperature range between +10° C. and 50° C., wherein the aroma-adsorbing nutritional substance is non-dearomatized roasted coffee powder containing intrinsic aroma volatiles;

passing the carrier gas through the aroma-adsorbing nutritional substance comprised in the second cell, thereby forcing the aroma-adsorbing nutritional substance to adsorb volatile aromas from the carrier gas in one single step through the second cell with the temperature in the second cell consisting of the single temperature range between +10° C. and 50° C.;

returning the carrier gas from the second cell to the first cell; and repeating the previous steps, thereby allowing the gas to re-circulate in the first cell and the second cell in a closed loop.

2. The method of claim 1, wherein the second cell is adjusted to a temperature between −10° C. and −50° C.

3. The method of claim 1, wherein the aroma-adsorbing nutritional substance in the second cell is stirred during circulation of the carrier gas in the second cell.

4. The method of claim 1, wherein the adsorption of volatile aromas is a condensation-free adsorption.

5. The method of claim 1, wherein the aroma providing substance is in freeze-dried form prior to the passing of the carrier gas through the first cell comprising the aroma providing substance.

6. The method of claim 1, wherein the first cell is adjusted to the temperature between 30° C. and 70° C. before a first pass through of the carrier gas, and wherein the second cell is adjusted to consist of the single temperature range between +10° C. and −50° C. C before the first pass through of the carrier gas.

7. A method for scenting a nutritional substance, the method comprising:

passing a carrier gas through a first cell comprising an aroma providing substance of non-coffee origin, thereby desorbing volatile aromas from the aroma providing substance by the carrier gas, wherein the first cell is adjusted to a temperature between 30° C. and 70° C., wherein the aroma providing substance brought into contact with the carrier gas is in the form of at least one dry solid selected from the group consisting of powder, peels, pieces, pellets, fibers, flakes, fragments, and combinations thereof, wherein the aroma providing substance is a substance of natural origin selected from the group consisting of fruits, spices, bark, herbs, plants, leaves, nuts, grains, seeds, flowers, blossoms, buds, roots, bulbs, rhizomes, wood, and combinations thereof, and wherein the water content of the aroma providing substance is lower than or equal to 3% in weight and wherein the carrier gas has a relative humidity of less than 5% (by weight);

transporting the carrier gas from the first cell to a second cell, wherein the second cell comprises an aroma-adsorbing nutritional substance, wherein the temperature in the second cell is adjusted to consist of a single temperature range between +10° C. and −50° C., wherein the aroma-adsorbing nutritional substance is non-dearomatized roasted and ground coffee powder;

passing the carrier gas through the aroma-adsorbing nutritional substance comprised in the second cell, thereby forcing the aroma-adsorbing nutritional substance to adsorb volatile aromas from the carrier gas in one single step through the second cell with the temperature in the second cell consisting of the single temperature range between +10° C. and −50° C.;

returning the carrier gas from the second cell to the first cell; and repeating the previous steps, thereby allowing the gas to re-circulate in the first cell and the second cell in a closed loop.

8. The method of claim 7, wherein the second cell is adjusted to a temperature between −10° C. and −50° C.

9. The method of claim 7, wherein the aroma-adsorbing nutritional substance in the second cell is stirred during circulation of the carrier gas in the second cell.

10. The method of claim 7, wherein the adsorption of volatile aromas is a condensation-free adsorption.

11. The method of claim 7, wherein the aroma providing substance is in freeze-dried form prior to the passing of the carrier gas through the first cell comprising the aroma providing substance.

12. The method of claim 7, wherein the first cell is adjusted to the temperature between 30° C. and 70° C. before a first pass through of the carrier gas, and wherein the second cell is adjusted to consist of the single temperature range between +10° C. and −50° C. C before the first pass through of the carrier gas.

* * * * *